United States Patent [19]

Cunningham

[11] 4,027,857
[45] June 7, 1977

[54] STATIC MIXER FOR FLOWABLE MATERIALS, AND RELATED METHOD

[76] Inventor: Ashley D. Cunningham, c/o Cunningham Industries, Inc., P.O. Box 353, Pawling, N.Y. 12564

[22] Filed: Feb. 23, 1976

[21] Appl. No.: 660,059

[52] U.S. Cl. ............................................. 259/4 AB
[51] Int. Cl.² ........................................... B01F 5/00
[58] Field of Search ............. 259/4 AB, 4 R, 4 AC; 138/37, 38, 42, 43; 48/180 R, 180 M, 180 B; 239/402

[56] References Cited
UNITED STATES PATENTS

| | | | |
|---|---|---|---|
| 325,459 | 9/1885 | Taylor | 138/42 X |
| 1,637,697 | 8/1927 | Jacobsen | 259/4 AB |
| 3,128,794 | 4/1964 | Boucher et al. | 259/4 AB X |
| 3,927,868 | 12/1975 | Moore | 259/4 AB |

Primary Examiner—Philip R. Coe
Attorney, Agent, or Firm—Mandeville and Schweitzer

[57] ABSTRACT

The disclosure relates to an improved static mixing nozzle, suited particularly for use in systems for delivering viscous molten plastics, for injection molding and like processes, but useful to good advantage in the mixing of other flowable materials, dry, liquid and gaseous. The mixing nozzle includes a cylindrical, tubular nozzle housing having inlet connection means for coupling with a plastic extruder or the like and a discharge nozzle at the opposite end. Within the cylindrical housing is a mixing element in the form of a cylindrical plug. The plug is provided with a plurality of sets of through bores, which extend at an angle from one side wall to the other, passing through the center axis of the plug. There are several stages of such bores, and each stage includes a plurality of mutually intersecting bores, which meet at the central axis of the plug. Four such intersecting bores per stage, in a unit of around five or six stages, provide a highly advantageous and practical static mixing device for typical application. The device is characterized by extremely high mixing efficiency, while providing a low pressure drop.

13 Claims, 3 Drawing Figures

STATIC MIXER FOR FLOWABLE MATERIALS, AND RELATED METHOD

BACKGROUND AND SUMMARY OF THE INVENTION

In the plastic molding industry, for example, the effective blending of colorants with base plastic material has been a continuing problem. Although some blending occurs in the molding machine and extruder, it typically is inefficient and inadequate. To compensate for imperfect blending, it is frequently necessary to add additional colorant. This has many disadvantages as will be outlined hereinafter. Quite independent of the matter of color and blending, efficient mixing of the viscous plastic material, as it flows to the mold, can be important in achieving greater uniformity of material temperature. Thus, temperature across a stream of flowing plastic material may vary by as much as 50° Fahrenheit, and this can be reduced or eliminated by efficient mixing of the plastic flow. This can have important advantages in reducing cycle time, providing greater uniformity of mold packing to reduce weight variations in the finished part, etc.

Because of the important advantages achievable from the blending of viscous plastic flow prior to discharge into a mold cavity, there have been a number of proposed arrangements for effecting so-called static mixing of the flowing matrial. In a static mixing procedure, the physical facility for effecting the mixing action is stationary or static, and the motion of the flowing plastic or other material is utilized to derive a mixing action.

The following United States Patents are illustrative of some of the known general types of static mixing units: Perdue U.S. Pat. No. 1,373,829, Boucher et al U.S. Pat. No. 3,128,794, Harder U.S. Pat. No. 3,195,865, Harder U.S. Pat. No. 3,404,869, Harder U.S. Pat. No. 3,583,678, Chisholm U.S. Pat. No. 3,652,061, Grout U.S. Pat. No. 3,704,006, Huber U.S. Pat No. 3,785,620. Insofar as I am aware, the static mixing devices reflected by these patents suffer from the disadvantage of either inefficient mixing performance or excessive pressure drop, or in some cases both. Thus, in those units where a relatively high degree of mixing efficiency is achieved, it is achieved at the cost of an excessively high pressure drop in the flowing material. This ncessitates pumps and equipment of higher capacity or, more typically, simply restricts the operating capacity of the molding or other process equipment in an undesirable way. In the past, achievement of high efficiency mixing and the provision of low pressure drop flow through the static mixing unit have seemed to be mutually inconsistent objectives.

Pursuant to the present invention, a highly simplified and inexpensive static mixing unit is provided which not only achieves exceptionally high efficiency in its mixing and blending functions, but does so with an extremely low pressure drop. In achieving both high efficiency mixing and low pressure drop, the static mixing device of the present invention represents a highly significant advance in the art. Even more surprising, however, is that this significant advance is achieved in a device which is highly simplified in nature, economical to manufacture, and dependable in use.

According to another feature of the invention, a static mixing unit having the significant advantages mentioned above is provided, which can be easily removed for cleaning or replacement if it becomes clogged. In this respect, almost any plastic molding or other system carrying flowable materials will inevitably carry foreign or tramp material from time to time, which can lodge in and clog the static mixing unit. In many of the mixing units presently available on the market, the removal of lodged foreign matter from the interior of the mixing unit is difficult to impossible to accomplish.

Certain aspects of the invention are also directed to the improved method of blending flowable materials, as achieved in the use of the new mixing unit.

For a more complete understanding of the above and other features and advantages of the invention, reference should be made to the following detailed description of a preferred embodiment and to the accompanying drawings.

DESCRIPTION OF A PREFERRED EMBODIMENT

Figure 1:
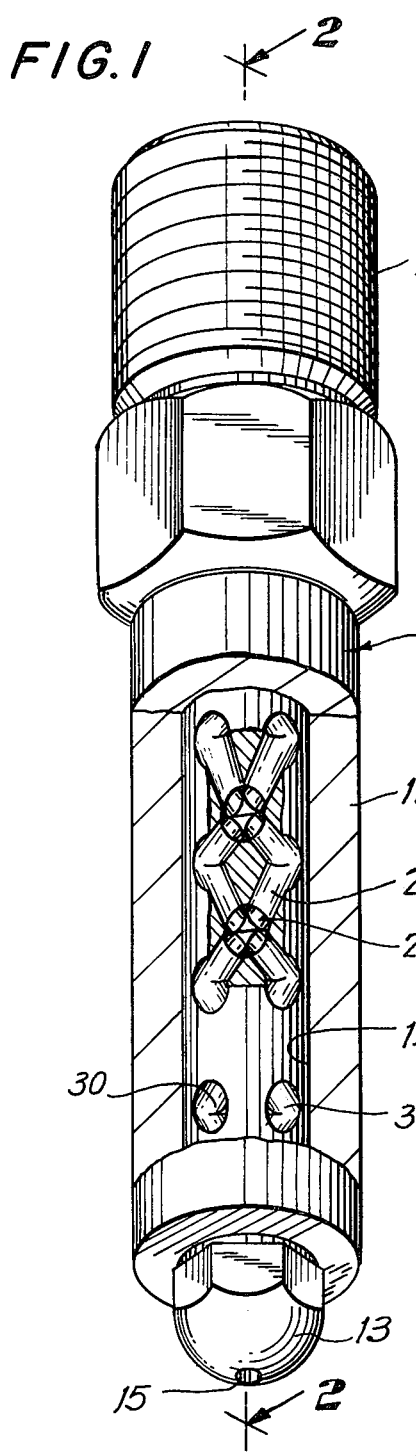
FIG. 1 is a perspective view of a plastic mixing nozzle incorporating a static mixing element according to the invention, with parts broken away to illustrate details of the nozzle and mixer structure.

Referring now to the drawing, the reference numeral 10 designates generally a nozzle body typical for utilization in connection with the delivery or output end of conventional commercial injection molding equipment, for example. The nozzle body includes a cylindrical tubular section 11, which is threaded internally at its discharge end 12 to receive a nozzle tip 13. The nozzle tip 13 is of conventional form, being provided with a receiving cavity 14 and a discharge orifice 15.

At its inlet end, the nozzle body 10 is provided with an externally threaded section 16, for connection to the extruder or other supply facility. The inlet end of the nozzle body is provided with an inlet passage 17, which discharges at 18 into an elongated cylindrical nozzle cavity 19. At its inlet end, the cavity 19 is terminated by a positioning shoulder 20, while the discharge end of the cavity is terminated by the end face 21 of the threaded nozzle 13.

Received within the nozzle cavity 19 is a cylindrical plug body 22, which comprises the static mixing element of the nozzle assembly. The plug body 22 is received with close tolerances within the cavity 19, and one end surface 23 of the plug is seated tightly against the shoulder 20 of the nozzle body. The plug 22 is secured tightly in position in the cavity 19 by tightening of the threaded nozzle 13 against the opposite end face 24 of the plug, as is evident in FIG. 2.

In accordance with the invention, the plug body 22 is provided with a plurality of mixing stages, each comprising a plurality of mutually intersecting cylindrical passages 25, typically formed by drilling through the material of the plug body. Although it is to be understood that the principles of the invention are not limited to units of particular dimensions, reference to typical dimensions may be convenient for purposes of illustration. To this end, a cylindrical plug body 22 suitable for use in conjunction with typical commercially available extruding and molding equipment, may have an overall diameter of around .8125 inch, and an overall length of around 4.73 inches. In a plug body of those typical dimensions, it is convenient to provide, in each of the several mixing stages, a plurality of four mutually intersecting passages 25, desirably angularly separated by 90°. To best advantage, the passages 25 are formed by boring through the plug material (typically stainless steel) at an angle, desirably around 45° to the axis of the plug. Thus, commencing at a predetermined transverse plane, such as that indicated by the phantom line 26 in FIG. 2, a plurality of four holes may be drilled through the body in a generally downward direction, as viewed in FIG. 2. Two such bores have their axes in a first common plane, while the second pair of bores have their axes in a second common plane at right angles to the first. In the specific form of the invention illustrated in the drawings, passages of approximately 0.250 inch in diameter are drilled through the plug body, with the location of the drill axis being such that all four bores of a given stage intersect at the center axis of the plug, as is indicated at 27 in FIGS. 2 and 3. The specifically illustrated unit includes five full stages, each of four intersecting bores 25, together with a half stage at each end.

Where the bores intersect with the outer cylindrical surface of the plug body 22, they also intersect with a similar bore of a preceding or subsequent stage. To advantage, the axis of intersecting bores of successive stages intersect substantially at the cylindrical surface of the plug, as reflected at 28 in FIG. 2, but in some cases it might be desirable to locate the successive stages of bores such that the bores intersect at slightly inside the cylindrical surface of the plug, so as to minimize restriction in the cross sectional area at the plane of the intersection. As reflected particularly in FIG. 3, at the region at which the several bores of a given stage intersect, on the center axis of the plug, the cross sectional form of the intersection, in the transverse plane of the plug body, is somewhat in the form of a cross with rounded ends, as illustrated at 29.

Where the four passages of a mixing stage intersect at 27, the combined cross sectional area of the passage, in the plane of the intersection, is slightly less than the combined cross sectional areas of the cylindrical passages. As a result, the four separate streams of material, which are flowing through the passages 25 and converging upon the intersection 27, are combined in the general region of the intersection plane and are given an increase in flow velocity, as a result of the area constriction. The Venturi action resulting from such area constriction has been established to be highly beneficial to the mixing efficiency of the system, particularly taken in conjunction with the fact that the flowing material, which is combined in the area of the intersection, is immediately re-divided into four separate streams as it flows downstream of the intersection. In the specific arrangement shown, a slight Venturi effect is also achieved at the exterior intersections, as designated by the reference numerals 30. The velocity increase thus occasioned at the exterior intersections 30 also enhances the mixing action; but perhaps to a lesser extent than at the center intersection 27, inasmuch as there is no subdivision of the streams at the intersections 30 as is the case at the central intersections 27.

Figure 2:
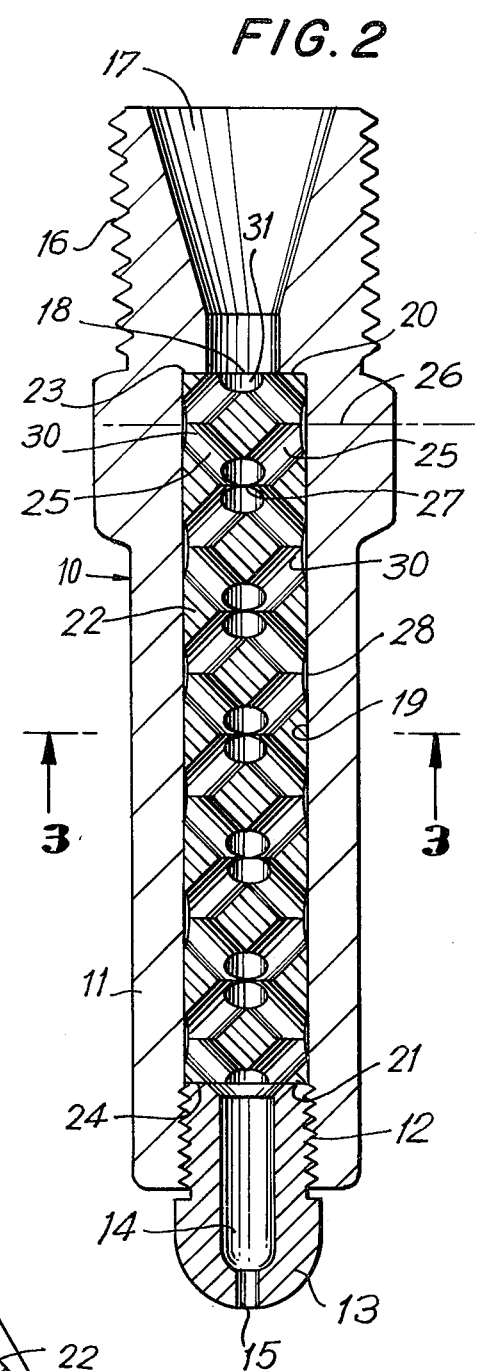
FIG. 2 is a longitudinal cross sectional view as taken along the axis 2—2 of FIG. 1.
Figure 3:
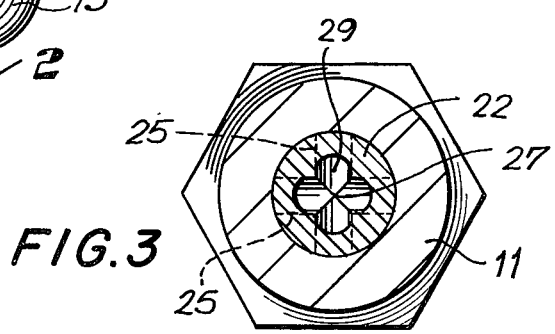
FIG. 3 is a cross sectional view taken on line 3—3 of FIG. 2.

In the operation of the mixing nozzle assembly illustrated in FIGS. 1–3, a viscous plastic material is flowed under pressure into the entrance passage 17 and up to the entry opening 31 in the mixing plug 22. As the material flows through the entry opening, it is subdivided into four separate flow streams and directed outward toward the walls of the cavity 19. At the first external intersection 30, the four streams are accelerated slightly and then diverted back inwardly to converge upon the central intersection 27 of the first mixing stage. The four streams are recombined at this intersection, and the flowing material is accelerated in velocity as it passes through the restricted flow opening 29. Immediately upon passing through the first central intersection, the recombined stream is again subdivided four ways and diverted toward the walls of the cavity 19.

As will be understood, particularly with a laminar flow material, such as a viscous plastic, the subdivision of the plastic stream takes on an exponentially increasing character (4, 16, 64, etc.) such that, by the time the stream passes through six full mixing stages, it has been subdivided 4096 times. In this respect, it is significant that, during each stage, the flowing material is recombined into a single stream.

Operating experience has established that, in connection with viscous plastic material, for example, as delivered from a conventional extrusion machine for injection molding, highly efficient mixing is achieved with markedly reduced pressure drop as compared to available static mixing devices of similar efficiency.

A multitude of advantages are realized from the improved mixing efficiency of the invention. For example, in a plastic molding operation, colorant cost can be significantly reduced, because equal color opacity can be achieved in a given mix with a substantially smaller amount of colorant, because of the improved distribution. This also has some beneficial side effects, in that improved impact strength, tear strength and low temperature flux are achieved as a result of improved colorant dispersion. and the number of rejects of molded parts is greatly reduced, because of the absence of color streaking. The improved mixing efficiency also results in substantial improvements in temperature uniformity throughout the material, enabling the material to be operated at a significantly lower average temperature. Holding time in the mold can thus be reduced significantly with concurrent increase in production capacity. Likewise, greater temperature uniformity results in improved uniformity of material viscosity. This enables a more uniform filling of the mold from part to part, reducing typical part weight variation from a very significant level 3 to 4percent) to a rather insignificant level (0.1% – 0.2%).

Although the static mixing unit has been described herein with specific reference to utilization in a plastic molding procedure, it should be understood that the principles of the invention are equally applicable to the mixing of wide varieties of materials, including granular powder materials, gaseous materials, and liquid materials. With many free flowing powder or granular materials, for example, the material may be permitted to flow vertically through the static mixing unit by gravity. Gaseous and liquid materials may be flowed through under appropriate line pressure, as will be readily understood.

The manner of manufacture of the plug 22 is not a critical aspect of the invention and would, to some extent, would be a function of the size of the unit and the material to be handled thereby. In the described unit intended for typical utilization in a molten plastic delivery system, the mixing plug may be produced by simply drilling through the plug, from one side to the other along the apropriate axis.

The number of mixing stages to be incorporated in a particular mixing plug is a function of the difficulty of mixing the particular material. The illustrated nozzle has effectively six stages of mixing, in that the material flow is subdivided six times and recombined six times, providing for an effective 4,096 splits of the stream. Typically, of course, a unit should incorporate the lowest number of mixing stages that will achieve the necessary mixing, so that unnecessary back pressure is not introduced into the system.

While the combined flow area of the static mixer is not considered particularly critical, it is desired in a typical molten plastic delivery system, for example, to provide for the combined area of four passages to approximate the flow area of the delivery passages of the extruder. With this relationship, the slightly reduced flow area at the central intersection will represent a constriction in relation to the outlet flow area of the extruder.

An important practical advantage of the new mixing unit resides in the fact that it is easily inserted in and removed from the nozzle body or other flow passage in which it is housed, to permit cleaning as may be necessary from time to time. Once the unit is removed, all of the passages through it are easily accessible, open at both ends, straight and of short length. The passages thus can be quickly cleaned of any foreign lodgement and returned to service.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:
1. A static mixing unit which comprises
   a. tubular housing having inlet and discharge ends,
   b. a static mixing plug body received closely within said housing and having a plurality of flow passages therein to accommodate that flow of materials between the inlet and discharge ends of said housing,
   c. said flow passages comprising a plurality of individual, angularly disposed passages extending from one side to the other of said plug element and arranged to repetitively combine and separate, whereby a stream of flowing materials is repetitively divided and recombined into single stream,
   d. all of said angularly disposed passages intersecting at a common point near the center of said plug body and forming at the area of intersection an opening of restricted area in relation to the combined area of the passages,
   e. said passages extending through the plug body and communicating at the surface of said plug body with adjacent similar passages,
   f. the interior wall area of said tubular housing forming part of the flow passages in the region of communication of said passages at the surface of the plug body.
2. The static mixing unit of claim 1, further characterized by
   a. said unit having a plurality of series-connected mixing stages,
   b. said passages for each mixing stage being formed by boring a plurality of straight openings extending completely through the plug body, at an angle to the axis thereof and intersecting said axis substantially at a common point.
3. The static mixing unit of claim 2, further characterized by
   a. there being, for each mixing stage, a plurality of four intersecting bores.
4. The static mixing unit of claim 2, further characterized by
   a. the passages of adjacent mixing stages intersecting substantially the surface of the plug body.
5. The static mixing unit of claim 4, further characterized by
   a. said body being removably received within said housing.
6. A static mixing unit for mixing flowable materials, which comprises
   a. a substantially solid body having a longitudinal axis and provided with an inlet end and an outlet end,
   b. a plurality of flow passages formed in said body,
   c. a first plurality of said flow passages communicating with said inlet end and extending angularly to the outer surface of said body,
   d. each of said flow passages converging from said outer surface centrally through said body to said longitudinal axis whereby all of said flow passages intersect at a common area along the axis of said body,
   e. said flow passages diverging from said common area to said outer surface and reconverging and diverging to intersect at one or more additional common areas at the axis of said body to provide a plurality of series related mixing stages, and
   f. said flow passages communicating with the outlet end of said body.
7. The static mixing unit of claim 6, further characterized by
   a. said body being in the form of a solid cylinder, and
   b. said flow passages comprising angularly disposed bores formed in said cylinder extending to and from the outer surface thereof.
8. The static mixing unit of claim 7, further characterized by
   a. said body being provided with a plurality of mixing stages, each including four flow passages intersecting the longitudinal axis of said body at an angle of approximately 45° thereto.
9. The static mixing unit of claim 6, further characterized by
   a. said common area common area comprising an irregularly shaped and restricted opening formed by said intersecting flow passages thereby causing a Venturi action in the flowing stream of material.
10. A static mixing nozzle which comprises
   a. hollow nozzle body including an inlet opening and a discharge opening,
   b. a static mixing unit axially received in the hollow interior of said nozzle body and disposed between said inlet and discharge openings,
   c. said static mixing unit comprising a substantially solid body having a longitudinal axis and including an inlet end communicating with said inlet opening and an outlet end communicating with said discharge opening,
   d. a plurality of flow passages formed in said solid body, e. each of said flow passages communicating with said inlet end and diverging to outer surface areas of said solid body,
f. said flow passages converging from said outer surface areas centrally through said body to said axis whereby all of said flow passages intersect at a common area at the axis of said body,
g. said flow passages diverging from said common area to said outer surface and reconverging and diverging to intersect at one or more additional common areas of the axis of said solid body, and
h. said flow passages communicating with the discharge opening of said nozzle body.

11. The method of mixing a stream of flowable materials comprising the steps of
   a. passing the stream through the inlet end of a static mixer,
   b. dividing the stream into a plurality of sub-streams,
   c. diverging the sub-streams outwardly away from a central axis extending in the direction of flow of the stream to the outer surface of said static mixer,
   d. thereafter converging the sub-streams toward said central axis until they intersect and blend in a common area at said axis,
   e. increasing the velocity of the flowing materials momentarily as said materials flow through said common area,
   f. repeating steps (b) through (d) until the stream is thoroughly mixed, and
   g. reuniting the sub-streams at the outlet end of said static mixer.

12. The method of claim 11, further characterized by
   a. the step of dividing is achieved by dividing the stream into four sub-streams.

13. The method of claim 12, further characterized by
   a. intersecting said sub-streams at an irregularly shaped opening of restricted area at said axis thereby creating a Venturi action in said stream.

* * * * *